E. B. ALLEN.
BUTTONHOLE CUTTING AND STITCHING MACHINE.
APPLICATION FILED APR. 30, 1918.
1,330,156.
Patented Feb. 10, 1920.
4 SHEETS—SHEET 1.
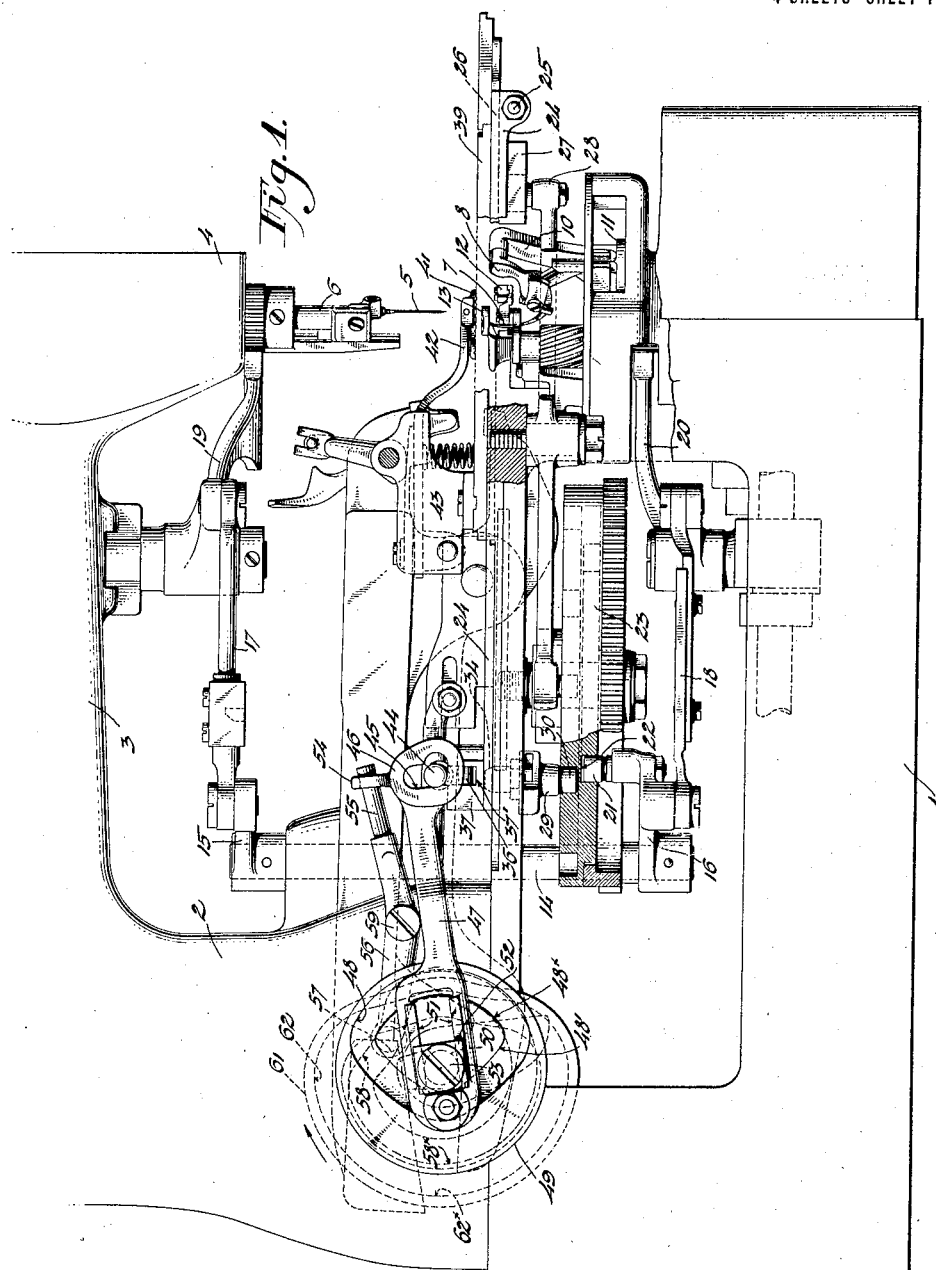

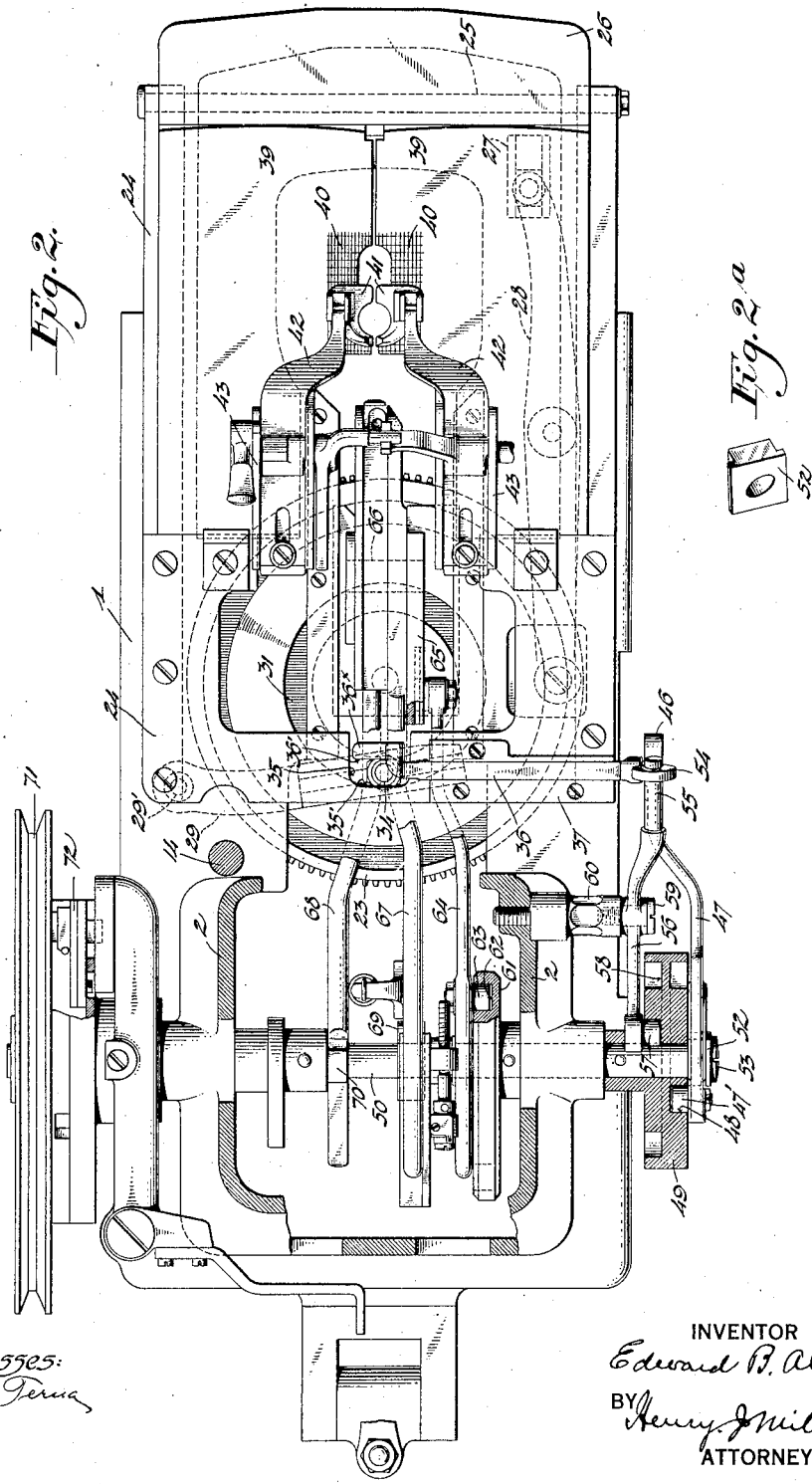

E. B. ALLEN.
BUTTONHOLE CUTTING AND STITCHING MACHINE.
APPLICATION FILED APR. 30, 1918.
1,330,156.
Patented Feb. 10, 1920.
4 SHEETS—SHEET 3.
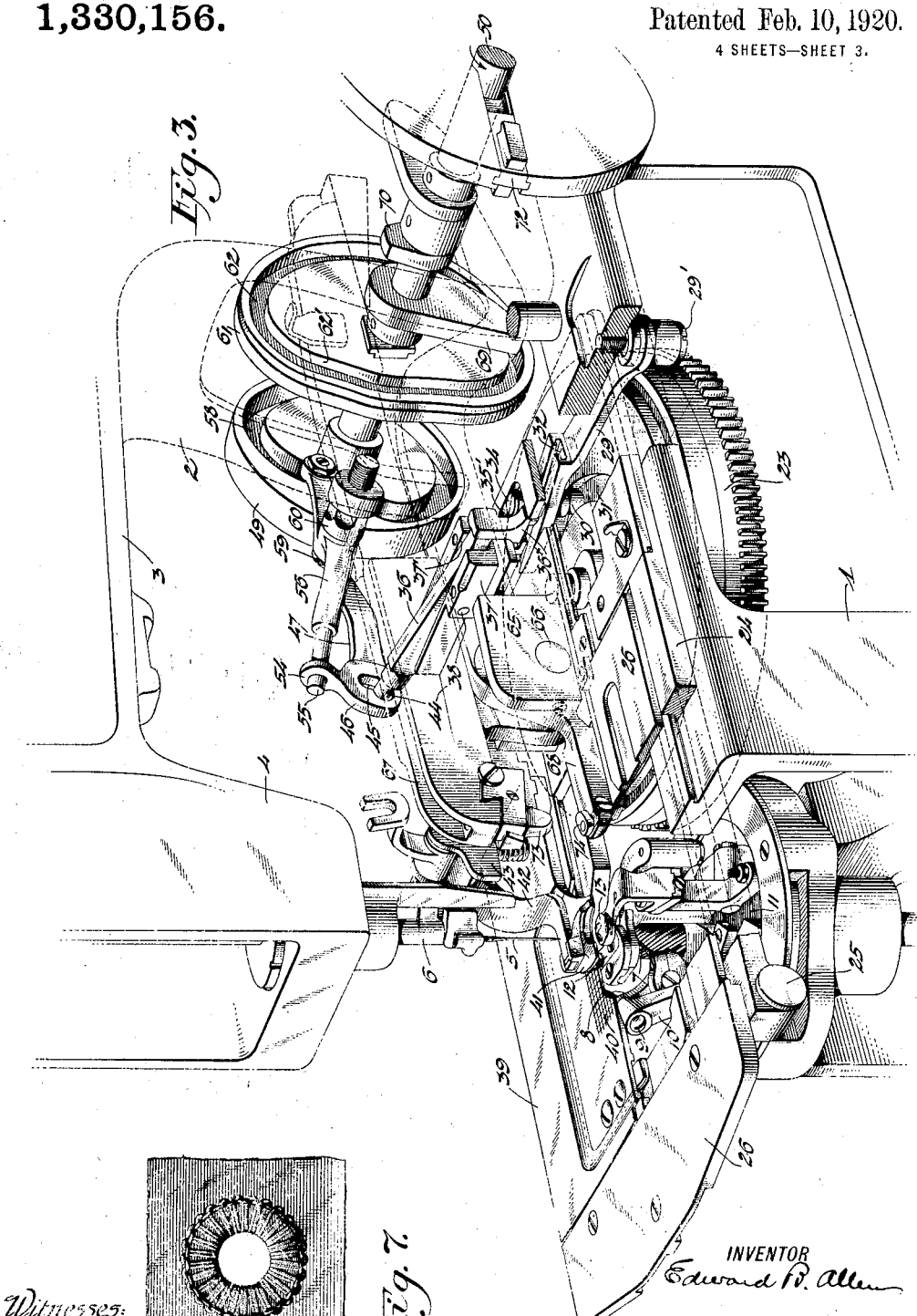
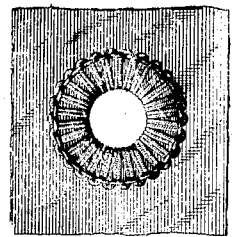
INVENTOR
Edward B. Allen
BY
Henry J. Miller
ATTORNEY E. B. ALLEN.
BUTTONHOLE CUTTING AND STITCHING MACHINE.
APPLICATION FILED APR. 30, 1918.
1,330,156.
Patented Feb. 10, 1920.
4 SHEETS—SHEET 4.
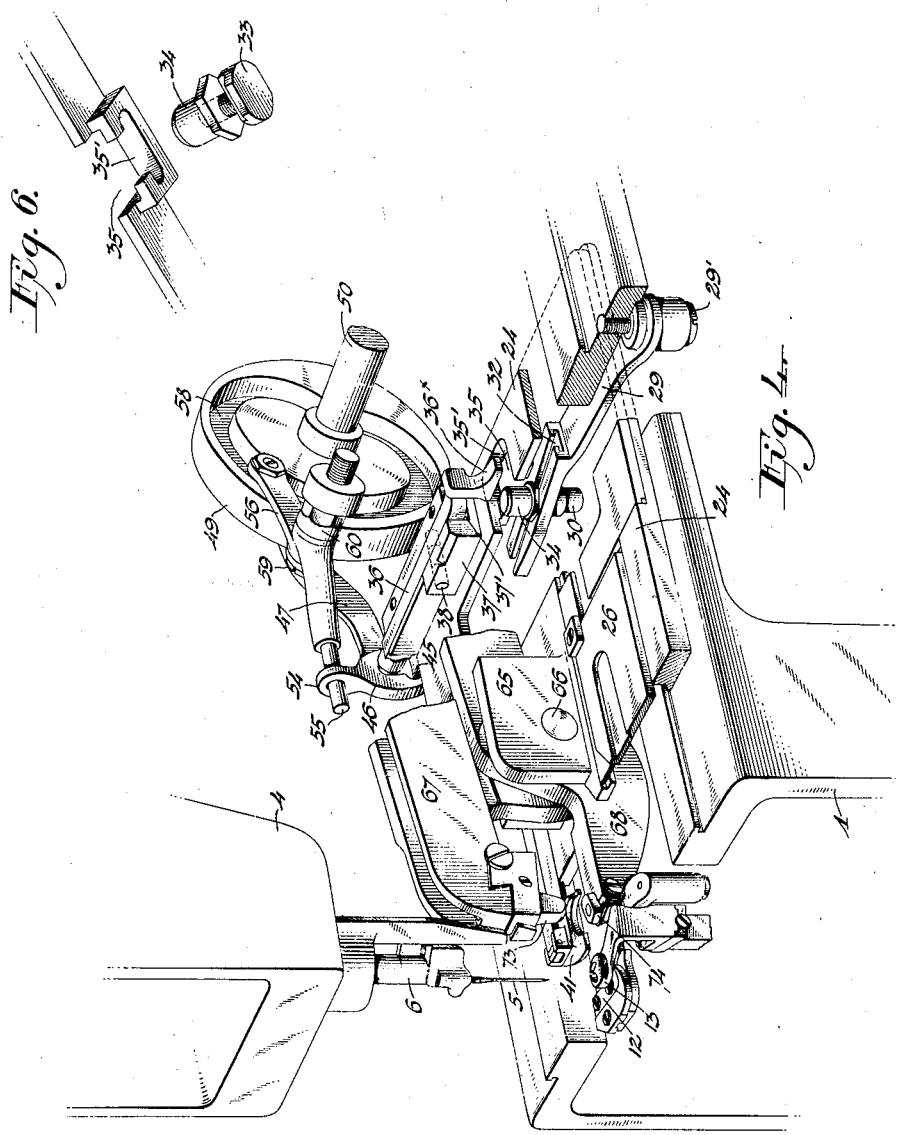
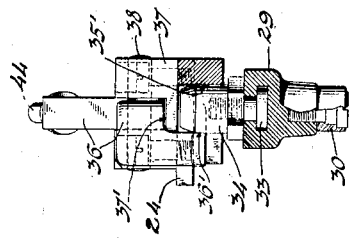

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

BUTTONHOLE CUTTING AND STITCHING MACHINE.

1,330,156.  Specification of Letters Patent.  Patented Feb. 10, 1920.

Application filed April 30, 1918. Serial No. 231,584.

*To all whom it may concern:*

Be it known that I, EDWARD B. ALLEN, a citizen of the United States, residing at Bridgeport, in the county of Fairfield and State of Connecticut, have invented certain new and useful Improvements in Buttonhole Cutting and Stitching Machines, of which the following is a specification, reference being had therein to the accompanying drawings.

This invention relates to buttonhole cutting and stitching machines and has for its primary object to increase the amount of work produced by such a machine by shortening the buttonhole cutting period of the complete buttonhole producing cycle.

A further object of the invention is to simplify and improve the mechanism of my prior machine illustrated in the U. S. Patent No. 1,048,786, of December 31, 1912, by obviating the necessity for tilting the throat-plate or other elements carried by the rotary turret sustaining the lower stitch-forming instrumentalities, when the cutter is advanced to cutting position.

Heretofore, it has been customary in some machines for the work to be clamped in stitching position and shifted to cutting position for the buttonhole cutting operation and then back to stitching position. In other machines wherein the work is clamped in stitching position, the button hole cutting mechanism is advanced from inoperative position to cut the buttonhole in stitching position and then recedes to afford the necessary clearance for the stitch-forming instrumentalities in their action in stitching the buttonhole. In these machines, however, it will be readily understood that a considerable fraction of the time required for the machine to run through a complete buttonhole producing cycle is consumed in moving the work-holder the entire distance to the cutter and back again to stitching position, or in advancing the relatively heavy cutter-levers the entire distance from their inoperative position to cut the buttonhole in stitching position and then retracting the cutter-levers the entire distance to their inoperative position.

In buttonhole sewing machines of another type, the work is clamped in a position intermediate the stitching point and the buttonhole cutting elements and it is not necessary that the cutters be shifted all the way to stitching position in order to cut the buttonhole. In these machines, however, after the buttonhole has been cut a relatively heavy train of mechanism including the feed-wheel is depended upon to shift the work to stitching position.

According to the present invention, in its preferred embodiment, the work is clamped in stitching position and to effect the cutting of the buttonhole in the least possible time, the work-holder and cutter-levers are shifted substantially simultaneously in opposite directions and thus caused to meet each other half way. In other words, the work-holder is shifted toward the cutters and, at the same time, the cutters are shifted toward the work-holder so that the two meet at a given cutting position intermediate the stitching position and the normal retracted position of the cutting elements. When, as heretofore, the work is clamped in rear of stitching position the super-structure carried by the bracket-arm obstructs the operator's view of the work, making it difficult for the operator to accurately place the work in the desired position relatively to the work-clamps. By arranging for the clamping of the work in stitching position, the operator's view of the work is unobstructed and consequently the work may be positioned in the clamps with speed and precision, thus making for greater production. It will be appreciated that it only requires approximately one half the time to cause the work-holder and cutter-levers to meet each other for the cutting operation half way between their positions during the stitching operation, that is required to cause either the work-holder or cutter-levers to travel the entire distance.

During the stitching period of the cycle, the stitch-forming mechanism and work-holder are given a relative stitch-positioning movement through suitable connections with a feed-wheel. The feed-wheel, however, is not utilized to shift the work-holder or cutter-levers toward or from cutting position.

In the particular embodiment of the invention chosen for the purposes of the present disclosure means are provided for temporarily disconnecting the work-holder from the feed-wheel and connecting it to the cutter-shaft which, during its single rotation, quickly advances the cutter-levers half way to the stitching point and at the same time shifts the work-holder to meet the advancing cutters. The cutter-levers are closed at cutting position by the action of the usual cams on the cutter-shaft. After the buttonhole is cut, the work-holder is quickly returned to stitching position and, simultaneously with this movement, the cutters are retracted to inoperative position affording the necessary clearance for the stitch-forming instrumentalities carried by the usual rotary turret which, during the stitching operation, is given turning movements to place the radial stitches about the buttonhole.

In the accompanying drawings, Figure 1 is a left side elevation of a buttonhole cutting and stitching machine embodying the invention. Fig. 2 is a horizontal section through the standard of the machine, above the plate of the bed. Fig. 2ª is a detail perspective view of a guide-block fulcrumed to the cutter shaft as shown in Fig. 2. Fig. 3 is a perspective view of the machine with the cutter-levers in retracted or inoperative position and the work-holder in stitching position. Fig. 4 is a similar view of the machine with the cutter-levers and work-holder in cutting position. Fig. 5 is a vertical section through the coupling device between the feed-wheel and work-holder. Fig. 6 is a detail perspective view of an element of the coupling device. Fig. 7 is a plan view of a buttonhole or, specifically speaking, an eyelet produced by the present machine.

In the preferred embodiment of the invention, as illustrated, the machine frame comprises the hollow rectangular base 1 from the rear end of which rises the standard 2 carrying the bracket-arm 3 terminating in the hollow head 4.

The machine may be equipped with any suitable type of stitch-forming mechanism; that used in the present instance being constructed substantially in accordance with the disclosure of my U. S. Patent No. 1,162,207, of November 30, 1915. Stitch-forming mechanism of this type includes a straight eye-pointed needle 5 carried by the needle-bar 6 journaled in the head 4 for the usual reciprocatory and axial turning movements. The needle 5 makes the depth stitches and coöperates with a lower curved needle 7 which projects a loop of under thread through the depth stitch loop of upper thread and carries said loop of under thread over the edge of the work, positioning it at the upper side of the work for entry by the straight needle in its next descent. The curved needle 7 is sustained by an oscillatory needle-carrier 8 fulcrumed at 9, Fig. 3, to the post 10 rising from the turret 11, Fig. 1, mounted as usual for axial turning movements within the bed 1. The turret 11 sustains the usual looper 12, fully described in my said Patent No. 1,162,207 and also the throat-plate or button 13 which is located substantially at the stitching point and is apertured for passage of the straight and curved needles.

In placing radial stitches about the buttonhole, the stitch-forming mechanism is given step-by-step turning movements by means of the usual mechanism disclosed, for example, in my Patent No. 1,162,207 above referred to. Briefly, this mechanism comprises a vertical shaft 14 carrying at its opposite ends crank-arms 15 and 16 connected by links 17 and 18 to the similar sector gear-levers 19 and 20 which mesh with pinions on the needle-bar 6 and turret 11, respectively. The lower crank-arm 16 carries a cam-follower 21 entering the cam-groove 22 in the under face of the usual feed-wheel 23.

The work-holder, in the present embodiment of the invention, is constructed substantially in accordance with the disclosure of my copending application Serial No. 180,737, filed July 16, 1917, and comprises the usual longitudinally traveling slide-plate 24 sustaining at its forward end the cross-rod 25 which directs the lateral movement of the cross-slide plate or carrier 26 overlying the longitudinal slide-plate 24. Lateral components of motion are imparted to the carrier 26 by means of the usual slideway and lever connection 27, 28, Fig. 2, with the feed-wheel 23, while longitudinal components of motion are derived from the lever 29 fulcrumed at 29' to the bed 1 and carrying a downwardly projecting cam-follower 30 entering a cam-groove 31, Fig. 3, in the feed-wheel. The lever 29 is formed at its upper side with an under-cut slot 32 in which is fitted the headed screw 33, Fig. 5, which is clamped in adjusted position by means of the internally threaded stud-pin 34 which normally projects upwardly from the lever-arm 29 into a recess 35, Figs. 2 and 4, in the longitudinally traveling slide-plate 24.

The recess 35 is formed with a forwardly facing wall 35' against which the stud-pin 34 is normally retained by means of the rearwardly facing wall 36' at the downwardly and forwardly offset extremity of the coupling lever 36. The coupling lever 36 is pivoted within the guide-slot 37' in the block 37 by means of the fulcrum-pin 38; the block 37 being screwed to the rearward end of the longitudinally traveling slide-plate 24. It will be understood that when the parts are in stitching position, Figs. 2 and 3, the stud-pin 34 is confined between the spaced parallel walls 35', 36' carried by the longitudinally traveling slide-plate and consequently the forward and rearward movement of the stud-pin 34 derived from the feed-wheel 23 will be transmitted to the work-holder, giving to the latter the longitudinal components of its feeding motion.

The work-holder includes the usual clamp-plates 39, 39 mounted on the cross slide-plate 26 and formed with serrations 40 against which the work is clamped by the serrated clamping feet 41 pivotally secured to the forward ends of the clamp-arms 42 which are fulcrumed at their rearward ends within the brackets 43 secured to the clamp-plates 39 in the usual manner.

In the present embodiment of the invention, means are provided for temporarily uncoupling the work-holder from the stud-pin 34 to permit the work-holder to be rapidly shifted rearwardly to buttonhole cutting position while the feed-wheel 23 is stationary. Referring to Figs. 1, 3 and 4, it will be seen that the lever 36 is formed at its outer extremity with a cylindrical pin 44 which enters the L-shaped slot 45 in the vertically disposed plate-like extremity 46 of the link-bar 47 to the rear end of which is fixed a lateral cam-roll 47' entering the cam-groove 48 in the outer face of the cam-disk 49 fixed to an outboard projection of the cutter-shaft 50. The rear end-portion of the link-bar 47 is slotted to form spaced slide-ways 51 which embrace the block 52 mounted to turn upon the screw-pin 53 tapped into the end of the cutter-shaft.

The forward end of the link-bar 47 is supported by means of the apertured ear 54 extending upwardly from the extremity 46 of said link-bar and loosely entered by the forwardly extending pin-like extremity 55 of the lever 56 the rearward extremity of which carries a cam-roll 57 entering the cam-groove 58 cut in the inner face of the cam-disk 49; the lever 56 being fulcrumed upon the screw-pin 59, Fig. 2, tapped into the lateral stud 60 mounted on the standard 2.

When the parts are in stitching position, Figs. 1 and 3, the forward extremity of the link-bar 47 is supported in such a position by the lever 56 that the pin 44 is located in the horizontally extending portion of the L-shaped cam-slot 45 thus permitting the work-holder to partake of longitudinal movements produced by the feed-wheel through the lever 29. The extent of the longitudinal movement is not very great in the present embodiment of the invention for the reason that the machine is adapted to make a hole of a special type, to wit: a circular eyelet, such as shown in Fig. 7. It is to be understood that the horizontally extending portion of the L-shaped slot 45 may be lengthened considerably in adapting the machine to sew holes of other types, such as straight or eyelet-end buttonholes.

The cutter-shaft 50 carries the usual cutter advancing and retracting cam-disk 61 formed in one face with a cam-slot 62 entered by the follower-roll 63, Fig. 2, projecting laterally from the link-member 64, the forward end of which is pivotally connected to the usual traveling fulcrum-block 65 sustaining the fulcrum-pin 66 for the upper and lower cutter-levers 67 and 68, respectively. These parts of the cutting mechanism are all of well known construction and are shown, for example, in my U. S. Patent No. 1,135,933 of April 13, 1915. The rearward ends of the cutter-levers 67 and 68 embrace the cutter-shaft 50 between them and are acted upon by the usual cutter-closing cam-elements 69 and 70, respectively, fixed to the cutter-shaft.

The cutter-shaft 50 is actuated from the constantly running pulley 71 by means of the one-revolution clutch device 72 commonly used on buttonhole machines of the present character and disclosed in my said Patent No. 1,135,933. When the clutch device is tripped into action the cutter-shaft is connected to the pulley 71 for a single revolution only and is then automatically disconnected and brought to rest. The upper cutter-lever 67 carries the die or punch 73 which cuts the work against the anvil 74 sustained by the lower cutter-lever. In the present instance, the throw of the cutter-advancing cam 62 is sufficient to advance the cutting elements 73 and 74 approximately half-way from their normal retracted position toward stitching position or from the position shown in Fig. 3 to that shown in Fig. 4.

In the operation of the particular embodiment of the invention shown and described, the work is positioned under the clamping feet 41 which, being in stitching position are in plain view and readily accessible to the operator for quick and accurate positioning of the work. As the machine is started, the clamping feet are closed upon the work and the cutter-shaft controlling clutch 72 is tripped into action to impart a single revolution to the cutter-shaft 50. During the first part of the single revolution of said shaft, the lever 56 is rocked to depress the extremity 46 of the link-bar 47 thus causing the vertical portion of the L-shaped slot 45 to descend upon the pin 44 and depress the latter, thereby effecting the elevation of the offset extremity 36× of the lever 36 and the consequent uncoupling of the work-holder from the feed-wheel, as shown in Fig. 4. The descent of the vertical portions of the L-shaped slot 45 over the pin 44 effects the coupling of the work-holder to the cutter-shaft which, during a succeeding portion of its single revolution causes the eccentric portion 48' of the cam-slot 48 to pull the link-bar 47 rearwardly; the ear 54 sliding along the supporting pin 55. This movement of the link-bar 47 shifts the work-holder rearwardly from stitching position, Fig. 3, to cutting position, Fig. 4.

Simultaneously with this movement, the eccentric portion 62' of the cam-slot 62 acts upon the cam-roll 63, Figs. 2 and 3, to advance the cutter-levers to the position shown in Fig. 4, in which position the concentric or dwell-producing portions 48×, 58× and 62× of the cam-slots 48, 58 and 62, respectively, hold the work-holder and cutter fulcrum-block 65 stationary in cutting position while the cutter-closing cams 69 and 70 effect the closing of the cutting elements 73 and 74 upon the work. As soon as the cutters open, the fulcrum-block 65 and work-holder are substantially simultaneously returned to their respective initial positions, Fig. 3, after which the extremity 46 of the link-bar 47 is elevated by the action of the cam 58 upon the lever 56, thus lowering the extremity 36× of the lever 36 in front of the stud-pin 34 to couple the work-holder to the feed-wheel. In this position the horizontal portion of the L-shaped slot 45 is brought into registry with the pin 44 to permit the work-holder to partake of its longitudinal movements derived from the feed-wheel during the stitching operation. In the present embodiment, when the cutter-shaft comes to rest the stitch-forming mechanism is started and the overseaming stitches are placed about the buttonhole in the usual manner, the buttonhole cutting elements having retracted far enough to permit the stitch-forming instrumentalities carried by the turret 11 to function during the turning movements of the turret.

While the invention is described as embodied in a machine which cuts the buttonhole before it is stitched, it will be apparent to those skilled in the art that the invention is equally well adapted for embodiment in a machine which cuts the buttonhole after it is stitched. The details of construction are susceptible of material modification both in the form and arrangement of the various parts without departure from the invention or sacrifice of the advantages flowing therefrom.

The term "buttonhole" as used herein is intended to broadly cover a hole of any size or shape in fabric material and is not intended to be limited to a hole adapted solely for reception of a complementary button.

Having thus set forth the nature of the invention, what I claim herein is—

1. In a buttonhole cutting and stitching machine, in combination, stitch-forming mechanism, a work-holder adapted to clamp the work in stitching position, buttonhole cutting mechanism including cutting elements normally occupying an inoperative position remote from stitching position, and means for producing substantially simultaneous relative movements between said stitch-forming mechanism, work-holder and cutting elements to position the work-holder and cutting elements in a cutting position displaced from the stitch-forming mechanism a distance less than the distance from the stitch-forming mechanism to the cutting elements while the latter occupy their inoperative position.

2. In a buttonhole cutting and stitching machine, in combination, stitch-forming mechanism, a work-holder adapted to clamp the work in stitching position, buttonhole cutting mechanism including cutting elements normally occupying an inoperative position remote from stitching position, and means for shifting the work-holder and cutting elements substantially simultaneously to a cutting position intermediate stitching position and the inoperative position of the buttonhole cutting elements.

3. In a buttonhole cutting and stitching machine, in combination, stitch-forming mechanism, a work-holder adapted to clamp the work in stitching position, buttonhole cutting mechanism including a cutter-shaft and cutting elements actuated by said shaft and normally occupying an inoperative position remote from stitching position, and means actuated by said cutter-shaft for shifting the work-holder and cutting elements substantially simultaneously to a cutting position intermediate stitching position and the inoperative position of the buttonhole cutting elements.

4. In a buttonhole cutting and stitching machine, in combination, stitch-forming mechanism, a work-holder adapted to clamp the work in stitching position, buttonhole cutting mechanism including cutting elements occupying an inoperative position remote from stitching position, and means for shifting the work-holder and cutting elements substantially simultaneously in opposite directions to a cutting position substantially midway between the stitching point and the inoperative position of the cutting elements.

5. In a buttonhole cutting and stitching machine, in combination, stitch-forming mechanism, a work-holder, means including a feed-wheel for producing relative stitch-positioning movements between said stitch-forming mechanism and work-holder in the production of a stitched buttonhole, buttonhole cutting elements normally occupying an inoperative position remote from the stitch-forming mechanism, means including a cutter-shaft for advancing the cutting elements to a cutting position intermediate the stitch-forming mechanism and the inoperative position of said cutting elements, and means for disconnecting the work-holder from the feed-wheel and shifting said work-holder to cutting position.

6. In a buttonhole cutting and stitching machine, in combination, stitch-forming mechanism, a work-holder, means including a feed-wheel for producing relative stitch-positioning movements between said stitch-forming mechanism and work-holder in the production of a stitched buttonhole, buttonhole cutting elements normally occupying an inoperative position remote from the stitch-forming mechanism, means including a cutter shaft for advancing the cutting elements to a cutting position intermediate the stitch-forming mechanism and the inoperative position of said cutting elements, and means actuated by said cutter shaft for disconnecting the work-holder from the feed-wheel and shifting said work-holder to cutting position.

7. In a buttonhole cutting and stitching machine, in combination, stitch-forming mechanism, a work-holder, buttonhole cutting mechanism including cutting elements adapted for traveling movements toward and from cutting position and a cutter-shaft for closing said cutting elements upon the work, and means actuated by said cutter shaft for imparting to both the work-holder and cutting elements traveling movements toward and away from cutting position.

8. In a buttonhole sewing machine, a buttonhole cutter, a work-holder, a cutter-shaft, actuating means carried by said cutter shaft for shifting said buttonhole cutter and work-holder in opposite directions to meet one another, and means on said cutter shaft for imparting a cutting impulse to said buttonhole cutter.

9. In a buttonhole sewing machine, a work-holder, a feed-wheel, a coupling device between said work-holder and feed-wheel, said coupling device including a lever pivoted on said work-holder, buttonhole cutting mechanism including a cutter shaft, and means actuated by said cutter shaft for tilting said lever to uncouple the work-holder from the feed-wheel.

10. In a buttonhole sewing machine, a work-holder shifting device comprising a shaft, cam-elements carried by said shaft, a link-bar connected at one end to one of said cam-elements, a lever connected to another of said cam-elements and supporting the other end of said link-bar, an actuated element mounted on said work-holder and adapted to be operatively connected to the lever-supported end of said link-bar when the latter is in one position, and means whereby said connection is broken when the lever-supported end of the link-bar is shifted.

In testimony whereof, I have signed my name to this specification.

EDWARD B. ALLEN.